US012223858B2

United States Patent
Konnov et al.

(10) Patent No.: US 12,223,858 B2
(45) Date of Patent: Feb. 11, 2025

(54) SYSTEM AND METHOD FOR PROVIDING A DIGITAL SIMULATION OF AN INSTALLATION, AND CORRESPONDING COMPUTER PROGRAM PRODUCT

(71) Applicant: Siemens Energy Global GmbH & Co. KG, Bayern (DE)

(72) Inventors: Alexei Konnov, Karlsruhe (DE); Arthur Rosa de Souza, São Paulo (BR)

(73) Assignee: Siemens Energy Global GmbH & Co. KG, Bayern (DE)

( * ) Notice: Subject to any disclaimer, the term of this patent is extended or adjusted under 35 U.S.C. 154(b) by 397 days.

(21) Appl. No.: 17/640,690

(22) PCT Filed: Sep. 15, 2020

(86) PCT No.: PCT/EP2020/075757
§ 371 (c)(1),
(2) Date: Mar. 4, 2022

(87) PCT Pub. No.: WO2021/052955
PCT Pub. Date: Mar. 25, 2021

(65) Prior Publication Data
US 2022/0327948 A1 Oct. 13, 2022

(30) Foreign Application Priority Data
Sep. 19, 2019 (DE) .................... 10 2019 214 273.7

(51) Int. Cl.
*G09B 9/00* (2006.01)
*G09B 25/02* (2006.01)

(52) U.S. Cl.
CPC ............... *G09B 9/00* (2013.01); *G09B 25/02* (2013.01)

(58) Field of Classification Search
CPC .................................. G09B 9/00; G09B 25/02
See application file for complete search history.

(56) References Cited

U.S. PATENT DOCUMENTS

| 7,949,501 | B1 | 5/2011 | Iravani |
| 2009/0077106 | A1 | 3/2009 | Kawase |

(Continued)

FOREIGN PATENT DOCUMENTS

| CN | 101596112 A | 12/2009 |
| CN | 103279039 A | 9/2013 |

(Continued)

OTHER PUBLICATIONS

Kong Qing-Fu, Zeng Fan-Ming, Wu Jia-Ming, Wu Xiong-Xue; Research on the Developing Techniques of Marine Engine Virtual Training System; Microcomputer Information (Measurement and Control Automation); vol. 26; Issue 5-1; 2010 [English Abstract on p. 1].

(Continued)

*Primary Examiner* — Kesha Frisby
(74) *Attorney, Agent, or Firm* — Wolter Van Dyke Davis, PLLC

(57) ABSTRACT

A system and method for providing a digital simulation of a technical installation, and a corresponding computer program product, wherein the digital simulation is dynamically generated such that the digital simulation is adapted to a specified training scenario. This is accomplished using a provided basic class, which implements, independently of devices, functions of elementary hardware components, and using a library of virtual devices, which deterministically simulate the topology and the functional behavior of corresponding real devices. The virtual devices have a hierarchically nested structure, such that a hierarchically higher (Continued)

device comprises at least one hierarchically lower device and/or at least one of the elementary hardware components.

10 Claims, 3 Drawing Sheets

(56) References Cited

U.S. PATENT DOCUMENTS

| | | |
|---|---|---|
| 2010/0165874 A1 | 7/2010 | Brown |
| 2013/0203026 A1 | 8/2013 | Sundaresh |
| 2014/0229943 A1 | 8/2014 | Tian |
| 2015/0205893 A1 | 7/2015 | Drumm et al. |
| 2017/0025040 A1 | 1/2017 | Maturana |
| 2017/0148214 A1 | 5/2017 | Muniz-Simas |

FOREIGN PATENT DOCUMENTS

| | | |
|---|---|---|
| CN | 103760776 A | 4/2014 |
| CN | 108230440 A | 6/2018 |
| CN | 108268128 A | 7/2018 |
| CN | 208284105 U | 12/2018 |
| DE | 102006059829 A1 | 6/2008 |
| EP | 2897011 A1 | 7/2015 |
| EP | 3121667 A1 | 1/2017 |
| JP | 2004158016 A | 6/2004 |
| KR | 20020028633 A | 4/2002 |
| KR | 101715671 B1 | 3/2017 |
| WO | 2007142346 A1 | 12/2007 |
| WO | 2017014733 A1 | 1/2017 |

OTHER PUBLICATIONS

Yang Yibin, Li Min, Xie Hongwen; Desktop virtual maintenance training system based on Unity3D; Computer Applications; 2016; 36(S2); 125-128 [English Abstract on p. 1].

Chen Zonghai, System Simulation Techniques and Their Applications; University of Science and Technology of China Xue Press, First Edition. Jul. 31, 2009. [See Search Report for indication of relevance.].

Yin Guofu, Computer-Assisted Design and Manufacturing Technology; Huazhong University of Science and Technology Press, 1st edition, Sep. 30, 2009. [See Search Report for indication of relevance.].

English-language version of the Search Report dated Jul. 31, 2023 from corresponding Chinese Patent Application for Invention No. 202080066244.3 referencing the Non-Patent Literature as defining the general state of the art, as indication of relevance.

Schweiger, Gerald: "Modeling Technical Systems [716.055]"; Jan. 1, 2017 (Jan. 1, 2017); XP055756034; Retrieved from Internet: URL:http://www.ist.tugraz.at/_attach/Publish/Motes/ModellingModelica_1.pdf.

Adrian Pop et al: "ModelicaXML: A Modelica XML Representation with Applications"; Proceedings of the 3rd International Modelica Conference; Nov. 3, 2003 (Nov. 3, 2003); XP055756047; Retrieved from Internet: URL:https://modelica.org/events/Conference2003/papers/h39 Pop.pdf [on Dec. 2, 2020].

PCT International Search Report and Written Opinion of International Searching Authority mailed Dec. 14, 2020 corresponding to PCT International Application No. PCT/EP2020/075757 filed Sep. 15, 2020.

SYSTEM AND METHOD FOR PROVIDING A DIGITAL SIMULATION OF AN INSTALLATION, AND CORRESPONDING COMPUTER PROGRAM PRODUCT

CROSS REFERENCE TO RELATED APPLICATIONS

This application is the US National Stage of International Application No. PCT/EP2020/075757 filed 15 Sep. 2020, and claims the benefit thereof. The International Application claims the benefit of German Application No. DE 10 2019 214 273.7 filed 19 Sep. 2019. All of the applications are incorporated by reference herein in their entirety.

FIELD OF INVENTION

The present invention relates to a system and a method, both for providing a digital replica of a technical installation, and to a corresponding computer program product.

BACKGROUND OF INVENTION

Many technical installations today are so complex that extensive training of respective operating personnel is indispensable for the correct operation and maintenance of said installations. Difficulties often arise, however. As such, training on the respective installation itself, for example in a simulation or training mode of the installation, is often not feasibly possible for reasons of time and cost. The reason for this, for example, is that during such training the installation cannot work or be operated productively and waiting periods arise for numerous processes during the training, for example for starting up and shutting down the installation, for cooling components and/or suchlike, which often make no significant contribution to successful training.

In principle, it would be possible to build a second installation on which the training can take place while the original installation is in uninterrupted productive use. This is typically likewise infeasible, however, owing to the associated outlay.

Training the operating personnel in a separate training or teaching center is often difficult because installation-specific training often cannot be replicated there without considerable effort and the personnel to be trained are then absent from the actual installation during the training and additionally for travel times to and from the training center. Their absence from the actual installation is often undesirable because, during such periods, the installation may not be able to be operated, or may not be able to be operated with full efficiency or safety, or a respective installation operator may need to temporarily employ additional personnel, who may not be adequately familiar with the installation and might therefore likewise require training or teaching, however.

Precisely against the background of a foreseeable increase in the complexity of technical installations utilized in the future and the associated increased demands on respective operating personnel, there is thus a need to allow operating personnel to be trained as efficiently and economically as possible.

SUMMARY OF INVENTION

It is an object of the present invention to provide a way of training operating personnel of an installation in a manner that is improved compared to previous approaches. This object is achieved according to the invention by the subjects of the independent patent claims. Advantageous configurations and developments of the present invention are specified in the dependent patent claims, in the description and in the figures.

A system according to the invention is used, that is to say is configured, to provide a digital or virtual replica of at least one part of an installation for a virtual training. In other words, the system can thus be used to provide a digital or virtual twin of a technical installation or of a part of the installation, on which respective operating personnel can then be trained or taught. The digital replica can replicate the real installation in full or in part, for example depending on need and application. The digital replica can form or represent a virtual training environment or be part of such a virtual training environment or be designed for integration into such a training environment, for example.

The system according to the invention has a computer-readable data memory. This data memory stores at least a base class, which implements, in a device-independent manner, functions and, if necessary, further properties of elementary hardware components that are usable in different devices. Elementary hardware components for the purposes of the present invention are single components or component parts, such as for example operating elements, switches, levers, indicators, lamps, displays, connections or ports, input and output interfaces, electrical fuses, electrical lines, data lines and/or suchlike.

Furthermore, the data memory stores a library of virtual devices or assemblies, at least one of which incorporates or comprises at least one of the elementary hardware components. The virtual devices deterministically replicate a topology and a functional behavior of corresponding real devices. The virtual devices can thus emulate or simulate a real behavior of corresponding physical devices. A device for the purposes of the present invention is a set or a group of multiple functional parts or elements, for example of one or more elementary hardware components and/or further devices in each case.

Here, the fact that the virtual devices replicate or implement the functional behavior of the corresponding real devices means that, at least in terms of their intended functionality, the virtual devices exhibit the same reactions or effects as their real counterparts when they are subjected to or supplied with the same input signals or data. By way of example, the virtual devices can virtually or digitally replicate, or carry out, corresponding switching processes, functional sequences, calculations, signal outputs and/or suchlike. The respective real device does not necessarily need to be replicated down to the last detail, however. By way of example, a virtual device can represent a functionality or a process without simulating all of the internal details or subprocesses that the corresponding real device would implement, but that are not visible or discernible to a respective user or respective operating personnel. By way of example, processes, such as for example starting up (booting) a virtual device, can be shortened, for example by dispensing with a simulation of mechanical properties of components of the device, such as for example optical drives or hard disks, and instead representing the respective process, that is to say for example here the booting, without a waiting period as a result of an applicable change of status or state. Similarly, a virtual processor does not need to simulate every single transistor of the corresponding real processor here, for example, but rather can abstract the functionality, or the functional behavior, of the processor as a whole. In this way, the virtual devices and their implementation of the functional behavior of the corresponding real devices can advantageously be realized with reduced outlay and can still realistically represent the real devices at a functional level.

The virtual devices have a hierarchically interleaved structure in the present case, with the result that a hierarchically higher device comprises at least one hierarchically lower device and/or at least one of the elementary hardware components. In the latter case, the elementary hardware component may be in particular incorporated by reference to the base class. In particular a device of the lowest or bottommost hierarchic level can comprise, that is to say incorporate or be built from, one or more of the elementary hardware components. Hierarchically higher devices can comprise in particular at least one hierarchically lower device, such hierarchically higher devices additionally also being able to incorporate or comprise one or more of the elementary hardware components.

Both the base class and the library of the virtual devices may be part of a computer program here.

The system according to the invention is configured to dynamically generate, that is to say assemble or build, the digital replica from the virtual devices and/or the elementary hardware components in a manner matched to a predefined training scenario in each case. Here, the fact that the replica is generated in a manner matched to the respective training scenario can mean in particular that only the virtual devices that are actually needed based on the training scenario are loaded or used in each case. In other words, it is thus not necessary for the full complement of all virtual devices and elementary hardware components to be used for every training scenario and for every digital replica, that is to say for example for the whole installation that can be replicated by means of the system according to the invention for training purposes to be replicated. Which of the virtual devices and/or hardware components are loaded or used in which way when generating the digital replica in each case can be contingent on the individual case or application, that is to say can depend on the predefined training scenario and/or can differ according to the installation to be replicated.

This matched dynamic generation of the digital replica for a specific predefined training scenario in each case can advantageously simplify handling of the digital replica, that is to say can render it possible with less computation complexity and hence with less expensive computation hardware. The matched generation of the digital replica can also always advantageously create an installation-specific digital replica that allows the respective operating personnel to be trained in a manner that is particularly realistic and relevant in regard to the real installation, since the digital replica can correspond to precisely that real installation, and/or to a real scenario occurring on this installation, that the operating personnel can also encounter in reality, that is to say in physically real form.

A particular advantage in this case is that it is not necessary for a static digital replica to be generated manually for every installation and/or for every training scenario. Instead, the system according to the invention affords significantly simplified matchability and significantly improved flexibility on account of the dynamic generation of the digital replica, with the result that for example different training scenarios, different installations and/or different states of the respective installation can be realized and provided with much less effort and much more quickly and easily than is possible with previous methods.

To generate the digital replica, a scene or scenario constructor, that is to say a software component or a subroutine, that implements this functionality may be present, for example as part of a program code or computer program stored in the data memory. Particularly advantageously, the system can comprise a parser that is configured to read a file or plan describing the predefined training scenario and/or the installation to be replicated and to automatically generate therefrom a list of the respective devices and/or hardware components with a hierarchic structure or order that are needed for the training scenario and/or are included in the installation. The parser here can thus generate a hierarchically structured or ordered list or a list of the hierarchically structured or ordered devices and/or hardware components. Such a list is advantageously a resource that can also be used particularly easily to generate the digital replica. Such a parser can advantageously save manual work effort and hence time and costs. By way of example, the applicable file or the plan for the installation or the training scenario can be generated manually, for example by means of an appropriate scheduling or engineering system from which the file can be exported, advantageously in XML format.

The present invention allows or simplifies the generation and provision of a digital training environment for a virtual training on a digitally replicated, that is to say emulated or simulated, installation. To this end, the system according to the invention can have for example a processor connected to the data memory for processing program code stored on the data memory or a computer program stored in the data memory.

The system according to the invention can be a hardware system, for example a computer or the like. Similarly, the system can be wholly or partly digital, however, that is to say available in the form of data or program code, the data memory then being able to be a file, a data container or the like, for example. The fact that the system is configured to generate the digital replica can then mean that the system implements an appropriate functionality. The generated digital replica of the installation can be stored for example in the data memory or in another data memory, for example loaded into a volatile main memory and/or output via a hardware or software output interface.

The digital replica, or a digital or virtual training environment using said digital replica, advantageously allows an installation-specific training at least almost independently of location, with the result that respective operating personnel of the real installation do not need to leave said installation, for example, for the training. The present invention can thus improve a relevance and intensity and also quality of the training and hence ultimately a competence of the respective operating personnel particularly easily and inexpensively and increase the feasibility of the application or use of the training.

In an advantageous configuration of the present invention, based on the hierarchic structure of the virtual devices, each virtual device is linked to its hierarchically superordinate and subordinate devices, where these are present or provided. These links are able to be used to transmit or exchange signals between devices of different hierarchic levels. In other words, the virtual devices can thus have respective linkage points or pointers or virtual interfaces by way of which a connection and hence a data transmission to other devices or hardware components, or communication, is possible. An actual connection of the virtual devices to one another can be established at least in the digital replica. Thus, if for example not all of the virtual devices stored in the library are used for the digital replica, there is no connection between the virtual devices that are actually used in the digital replica and those that in each case are not used therein and are merely stored in the library.

The hierarchic signal transmission or communication structure provided here advantageously allows the real installation to be replicated particularly easily, accurately and logically consistently. The functional behavior not only of individual virtual devices but also of the digital replica as a whole assembled from multiple digital devices can also be implemented or reproduced particularly realistically in this way. The overall behavior of the installation may be much more complex than the behavior of all the individual virtual devices, for example owing to dependencies and links. By way of example, a fault in a hardware component or a virtual device can be forwarded or communicated or cascaded upward in the hierarchic structure by way of the connections or links, with the result that a hierarchically higher device that is reliant on the correct operation of the defective virtual device is itself able to signal a corresponding fault or that it is not functioning as intended. In this way, even complex situations, functionalities and dependencies can be correctly reproduced or replicated with relatively little effort.

In a further advantageous configuration of the present invention, there are individual stipulations for each virtual device regarding how said device reacts to signals that it receives from its hierarchically superordinate devices and/or its hierarchically subordinate devices and to which such signals it reacts. In other words, parent-child and message subscription principles are thus implemented in the system according to the invention. This allows a particularly robust way, and one that can be implemented with relatively little effort at the same time, of realizing correctly functioning digital replicas of different configurations or variants of the installation or even of different installations. By way of example, the hierarchic structure allows each virtual device to be provided with clear definitions and limits regarding which signals it can actually receive and possibly needs to output or forward. As such, it is advantageously not necessary for a reaction to each signal occurring in the installation to be implemented for every virtual device, for example if a specific signal cannot appear in a path or branch of the hierarchic structure that contains a specific virtual device or cannot be transmitted to the respective virtual device.

This also allows a complexity of the digital replica to be reduced, since for example no direct connections need to be made or implemented from each virtual device and/or each elementary hardware component to each other virtual device and/or each other elementary hardware component. Instead, for example a signal generated by a first virtual device and intended for a virtual device that is hierarchically subordinate to said first virtual device, but is separated by at least one hierarchic level, can be passed through or forwarded by a hierarchically interposed virtual device.

In a further advantageous configuration of the present invention, the system according to the invention uses the document object model (DOM) in order to implement the hierarchic structure of the virtual devices. It is therefore possible for the virtual devices to be represented as interleaved containers, for example. The DOM advantageously allows a standard, that is to say non-hardware- or installation-specific, implementation for example of behavior scripts for all the relevant hardware components, or devices. The DOM advantageously provides, among other things, a robust way of generating, managing, adding, removing or modifying documents and of creating and navigating in an interleaved or hierarchic structure, and can handle a large bandwidth of different data in doing so. "Documents" are accordingly meant to be understood in the broadest sense here and can also be or include files, elements or information that can typically be referred to more as data rather than as documents in the conventional sense.

It has been found that the DOM is particularly suitable for replicating even complex technical installations, and relationships and dependencies between the individual devices and hardware components thereof, since it already itself provides for a similar hierarchic structure and directly allows the structure, or the digital replica generated on the basis thereof, to also be set up and matched dynamically and flexibly.

In a further advantageous configuration of the present invention, the functional behavior of the virtual devices—and possibly of the elementary hardware components—is implemented by a respective script, that is to say a behavior script, a reaction of the respective device to a signal transmitted to this device being described in the scripts. A signal in this context can be or indicate an instruction, a transmission of data, an event and/or suchlike, for example. Reactions to such signals can be or include triggering of a switching process, actuation of a hardware component or of a further virtual device, forwarding of the signal to the next hierarchic level, activation or deactivation of a hardware component or of a virtual device, changing of a state or status, generation of a response signal and/or suchlike, for example. The use of scripts, that is to say files or programs written in a script language, for implementing the behavior has been found to be particularly advantageous, for example because there is inherent provision here for dependencies, calls and accesses by other program parts representing other hardware components and/or other virtual devices, for example, and flexible and dynamic matching of the behavior, that is to say that these are particularly easy to realize.

In a further advantageous configuration of the present invention, the system comprises a respective implementation class for each virtual device, in which properties of the respective virtual device that are not described in the base class are indicated. By way of example, such an implementation class can include definitions or indications regarding from which of the elementary hardware components the respective virtual device is set up and how, that is to say in which topology, these hardware components are arranged relative to one another. Similarly, it can indicate which hierarchic level the device is situated on, that is to say of which hierarchically higher device or devices it is part and/or which hierarchically subordinate devices it comprises and/or suchlike. Such a class-based implementation of the virtual devices advantageously allows different digital replicas of the installation to be generated flexibly and dynamically using the same resources, for example to be initialized, that is to say incorporated into the digital replica, with different provisions or states. This then advantageously does not require a separate static implementation to be produced manually from scratch for every variant, that is to say for every different digital replica.

In a further advantageous configuration of the present invention, the system according to the invention comprises a respective virtual graphical 3D model for each of the virtual devices, advantageously also for the elementary hardware components. These 3D models may be incorporated in the described implementation classes for the virtual devices, for example. Particularly advantageously, the 3D models may be dynamic, that is to say for example can adopt different states. By way of example, indicator elements, such as for example LEDs, status indicators or the like, may be able to be switched on and off, single parts, such as for example a valve, a cover, a lever or the like, may be movable into different positions and/or suchlike. The virtual graphical 3D models advantageously allow the digital replica to be made particularly distinctive and realistic and hence to enable particularly intuitive and immersive virtual training. The 3D models can be connected or linked to one another according to a logical and hierarchic structure of the virtual devices, or of the respective digital replica, in order to make this structure and hence a mode of operation of the replicated installation particularly distinctively accessible to the respective operating personnel for training purposes.

A further aspect of the present invention is a method for providing a digital or virtual replica, that is to say a digital twin, of at least one part of an installation for a virtual training. A method step of the method according to the invention involves providing a—in particular the aforementioned—base class, which implements, in a device-independent manner, functions and possibly further properties of elementary hardware components that are usable in different devices. A further method step of the method according to the invention involves providing a—in particular the aforementioned—library of virtual devices or assemblies classified into a hierarchy, at least one of which virtual devices or assemblies incorporates at least one of the elementary hardware components and which virtual devices or assemblies deterministically replicate a topology and a functional behavior of corresponding real devices or counterparts.

A further method step of the method according to the invention involves reading in a predefined training scenario. This can comprise reading in a plan for the technical installation that is to be replicated. As part of the training scenario, there can be an indication here—as likewise within the context of the system according to the invention—of for example which components, devices or parts of the real technical installation are meant to be replicated, in which state they are meant to be—for example operating state, switched-on status, functional status, fault state or the like—and/or which task or tasks are meant to be completed during the training.

A further method step of the method according to the invention involves automatically dynamically generating the digital replica from the virtual devices and/or elementary hardware components that are needed based on the training scenario.

The method according to the invention can furthermore comprise steps, measures or processes described within the context of the system according to the invention as further, possibly optional, method steps.

The system according to the invention may be configured to perform or carry out the method according to the invention. Accordingly, the equipment or devices described or mentioned as appropriate within the context of the system according to the invention can be used to perform the method steps of the method according to the invention.

In an advantageous development of the present invention, the generated digital replica is embedded into a virtual training environment and this virtual training environment is output to an AR (augmented reality) device or to a VR (virtual reality) device. Such devices may be for example smartglasses, an HMD (head-mounted display), an appropriately equipped space or the like. The virtual training environment can present a user or observer, that is to say for example the installation's operating personnel to be trained, with a virtual spatial environment in which the digital replica of the installation is shown and can be interactively operated or manipulated. In the virtual training environment, it is thus possible for example for operator control sequences or maintenance measures, such as for example replacement of a device or the like, to be accomplished or performed virtually. This allows a particularly distinctive and immersive and hence particularly intensive and high-quality training, in particular without then endangering the corresponding real installation through operator errors or the like or having to interrupt operation of the real installation.

Compared to a training on the real installation, the training in the virtual training environment on the basis of the digital replica of the installation can be particularly efficient in terms of time, since for example processes or sequences that take up a certain amount of time in reality can be shortened in the virtual training environment as described. By way of example, in the case of a complex real installation, starting up or shutting down the installation can take several minutes, during which the respective user can perform no further measures or control actions. This can be shortened to a few seconds in the virtual training environment, for example, since only the relevant process needs to be represented here. Such periods can thus be reduced or shortened in the virtual training environment, advantageously allowing a time efficiency and a density of the training to be improved.

A further aspect of the present invention is a computer program product comprising commands or control instructions that, when executed by a computer, in particular a system according to the invention, cause this computer to perform or carry out at least one embodiment of the method according to the invention, in particular automatically or semiautomatically. Providing the base class and the library can mean or include for example recording or reading in or loading said base class and library into a data memory and/or making them accessible by way of a software and/or hardware interface or by outputting a reference, for example to a function or method or a program module or a data processing device, for example a computer or processor or the like used for the method. The computer program product according to the invention may thus be a computer program. Similarly, the computer program product according to the invention may be a computer-readable data medium on which such a computer program is stored.

Each of the properties and developments of the system according to the invention that are specified hitherto and below, and the corresponding advantages, can be applied, mutatis mutandis, to the other aspects of the invention, that is to say to the method according to the invention and the computer program product according to the invention, and vice versa. The invention thus also includes such developments of these aspects of the invention as have configurations that are not described explicitly in the respective combination or not described for each aspect of the invention separately here in order to avoid unnecessary redundancy.

BRIEF DESCRIPTION OF THE DRAWINGS

Further features, details and advantages of the present invention will emerge from the description of exemplary embodiments that follows and with reference to the drawings, in which.

DETAILED DESCRIPTION OF INVENTION

The exemplary embodiments explained below are embodiments of the invention. In the exemplary embodiments, the described components of the embodiments each represent individual features of the invention that should be considered independently of one another and that each also develop the invention independently of one another and hence should also be regarded as part of the invention individually or in a combination other than that shown. In addition, the described embodiments can also be complemented by further features of the invention that have already been described.

In the figures, elements that are the same, have the same function or correspond to one another are denoted by the same reference signs in each case.

Figure 1:
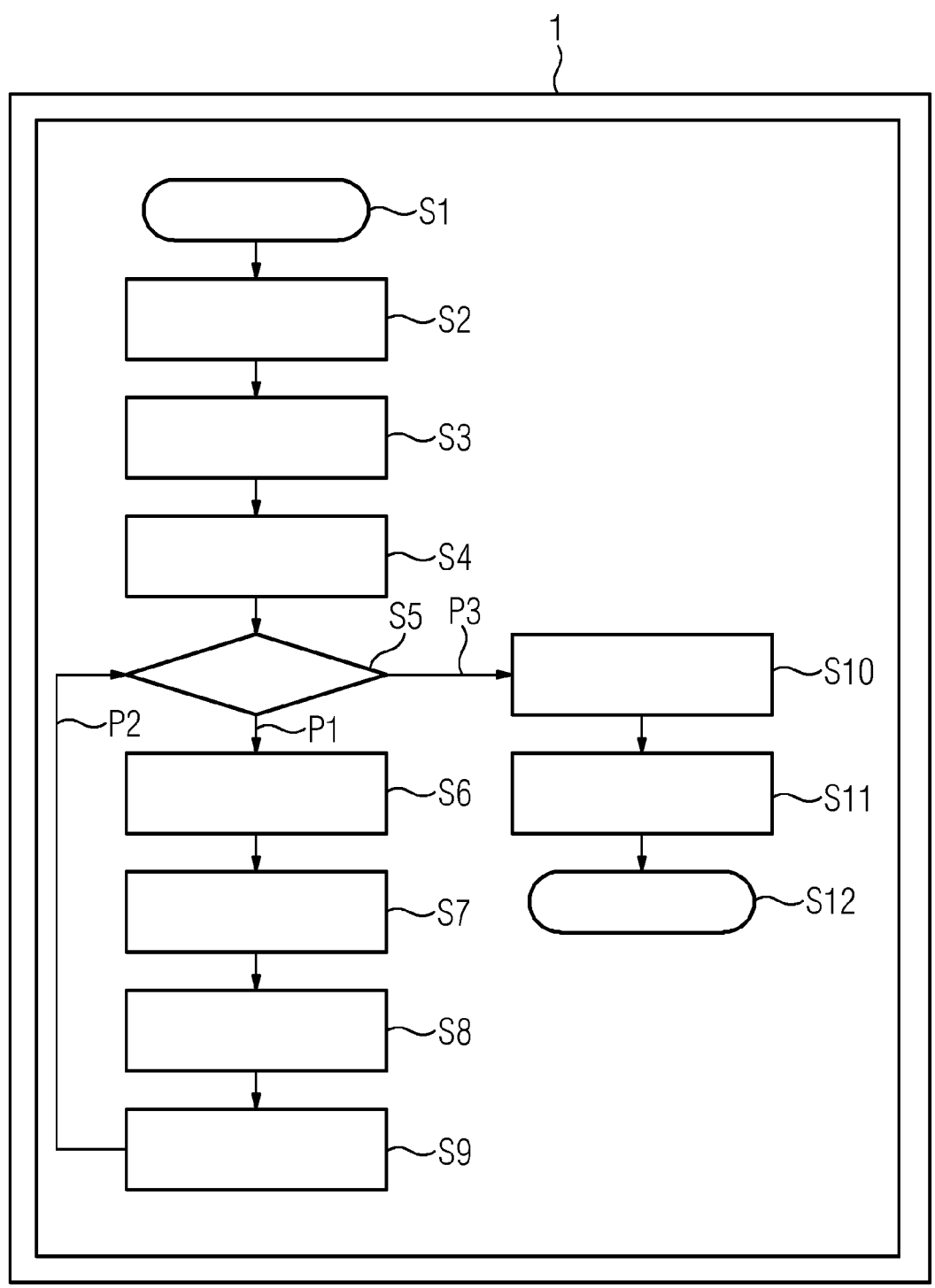
FIG. 1 shows an illustrative schematic flowchart for a method for providing a virtual training.

FIG. 1 schematically represents a system 1 and a method for providing a digital replica of a technical installation for training purposes. By way of example, the system 1 can be a computer having a data medium on which a computer program that implements the method is stored. Such a computer program is represented in the form of an illustrative schematic flowchart here. The method and hence the functionality or mode of operation of the system 1 shall be explained below also with reference to the other figures.

In a method step S1, the method is started. By way of example, the system 1 can be started up here. Similarly, by way of example, a training scenario can be predefined and can be recorded by the system 1 here.

In method step S2, installation and device information is recorded. By way of example, a plan for an installation that is to be replicated, a base class that implements functions of elementary hardware components 3 in a device-independent manner (cf. FIG. 2) and a library of virtual devices 2 (cf. FIG. 2) that deterministically replicate a topology and a functional behavior of corresponding real devices can be read in or loaded here. The base class, for example referred to as device.cs, can thus include core functions and properties for all of the relevant hardware components 3 for the digital replica and the use thereof in the VR training environment.

In the present case, the installation to be replicated can be for example a control engineering system for a power station, for example the Siemens SPPA-T3000 system. This installation is built from a multiplicity of single devices and components that have respective individual functions and properties and are operatively or functionally connected to one another, that is to say for example can exchange signals with one another.

Figure 2:
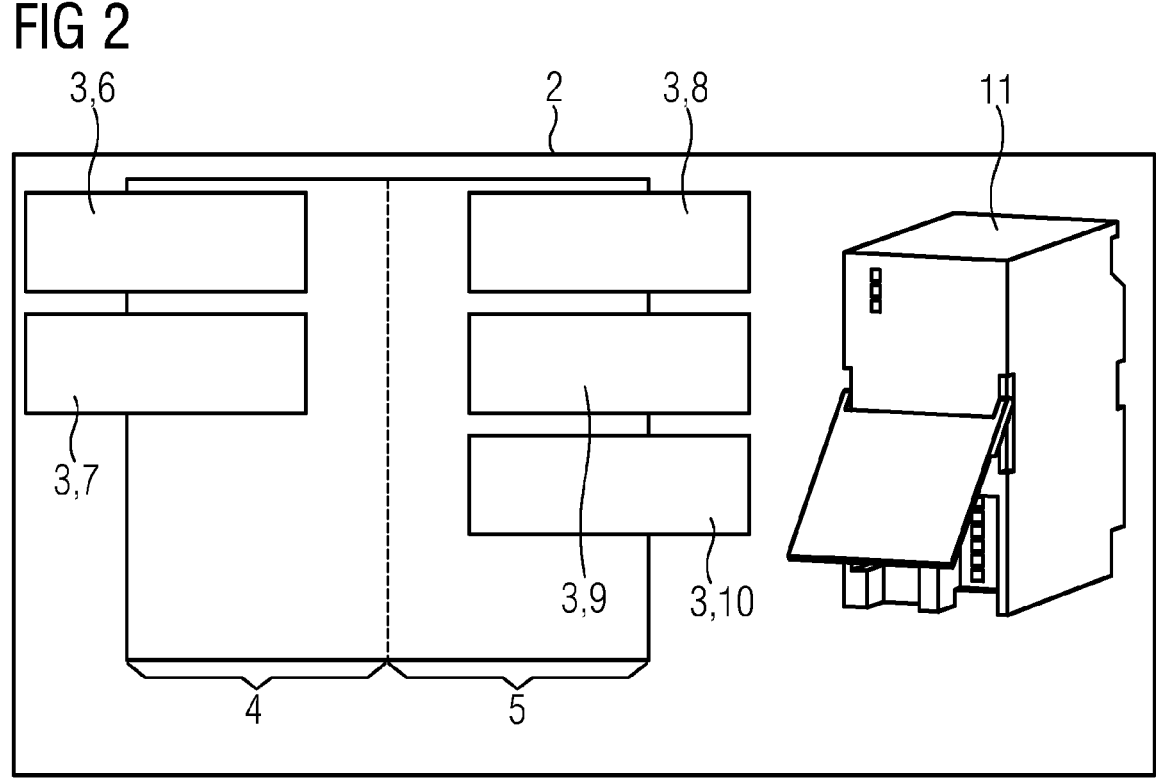
FIG. 2 shows a schematic representation to illustrate a virtual device.

FIG. 2 shows a schematic representation to illustrate a virtual device 2. In the present case, the virtual device 2 comprises multiple elementary hardware components 3 and is schematically broken down into an input area 4 (input) and an output area 5 (output) here, over which the hardware components 3 are distributed. In terms of logic and circuitry, for example a rack connection 6, that is to say a port for connection to a rack, and a switch 7 for switching on and switching off the virtual device 2 may be arranged in the input area 4. In the output area 5, there may accordingly be arranged for example a status indicator 8, for example in the form of an LED or the like, a phase connection 9 and a grounding connection 10, that is to say appropriate ports for connecting a power cable or for making an electrical connection to a power supply grid.

The virtual device 2 can be a power supply unit, for example, such as for example the Siemens PS327. However, a multiplicity of different devices may be virtually represented in a corresponding manner. Which hardware components 3 the virtual device 2 comprises in which arrangement can be described for each virtual device 2 in a respective implementation class, for example, which can be loaded as part of the library in method step S2, for example. In the present case, the virtual device 2 also comprises a virtual graphical 3D model 11 or a reference to this 3D model 11, by means of which the virtual device 2 can be represented for a respective user in a VR training environment.

The data or information recorded in method step S2, for example in the form of an XML file, is processed by means of a parser of the system 1 in a method step S3 to form a list of virtual devices 2 and hardware components 3 that provide evidence of a hierarchic structure. The parser can thus convert a respective present provided plan, for example for the SPPA-T3000 system, into a hierarchically structured list of this type, for example.

Figure 3:
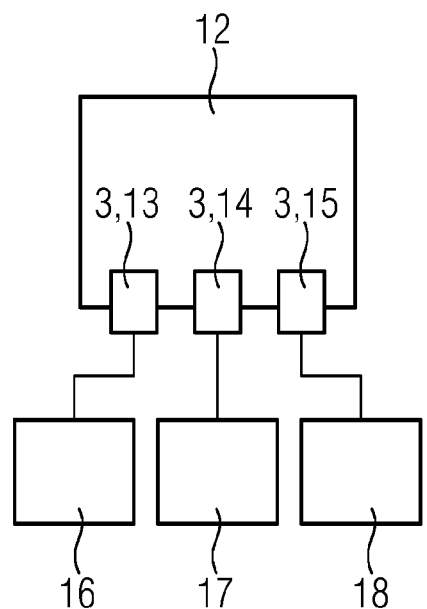
FIG. 3 shows a schematic representation to illustrate a hierarchic installation design.

FIG. 3 shows a schematic representation to illustrate a hierarchic installation design. On a topmost hierarchic level, there is a rack 12 here, which for its part has at least a first port 13, a second port 14 and a third port 15 as elementary hardware components 3. These ports 13, 14, 15 have elements of a lower hierarchic level connected to them. In the present case, these are for example a power supply unit 16 connected to the first port 13, a processor 17 connected to the second port 14 and a communication processor 18 connected to the third port 15. The power supply unit 16, the processor 17 and/or the communication processor 18 may themselves be virtual devices 2 and accordingly themselves have elementary hardware components 3 or be treated as elementary hardware components 3.

Figure 4:
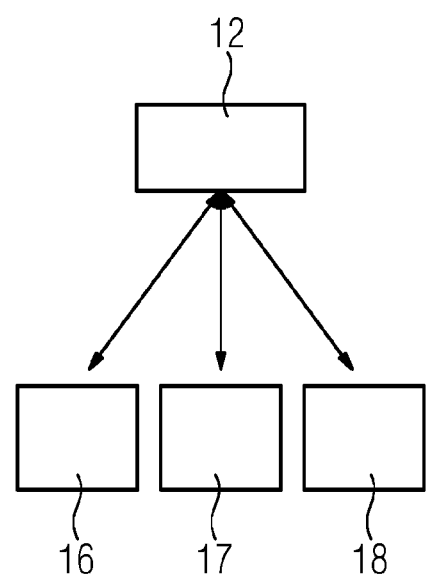
FIG. 4 shows a schematic representation to illustrate a signal flow structure for the devices of the installation design from FIG. 3.

The rack 12 is thus a hierarchically superordinate unit here, on which the hierarchically subordinate elements 16, 17, 18 are hierarchically dependent, with the result that a parent-child structure is obtained. A signal flow between the devices or components 12, 16, 17, 18 also forms accordingly. In this regard, FIG. 4 shows a schematic representation to illustrate the signal flow between the devices or elements 12, 16, 17, 18 of the installation design from FIG. 3. A signal transmission to the devices or components 16, 17, 18 takes place from the hierarchically superordinate rack 12 or via said rack. This may be the case in particular even if the rack 12 with the devices or components 16, 17, 18 arranged or held therein is itself part of a virtual device 2 that is arranged even higher in the hierarchy.

Figure 5:
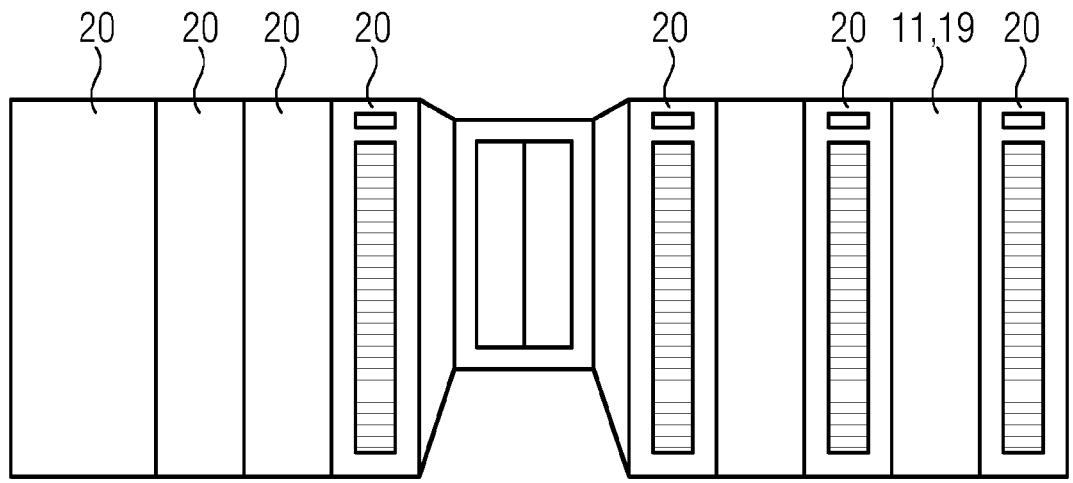
FIG. 5 shows a schematic representation of a peripheral rack comprising multiple hierarchically subordinate devices.
Figure 6:
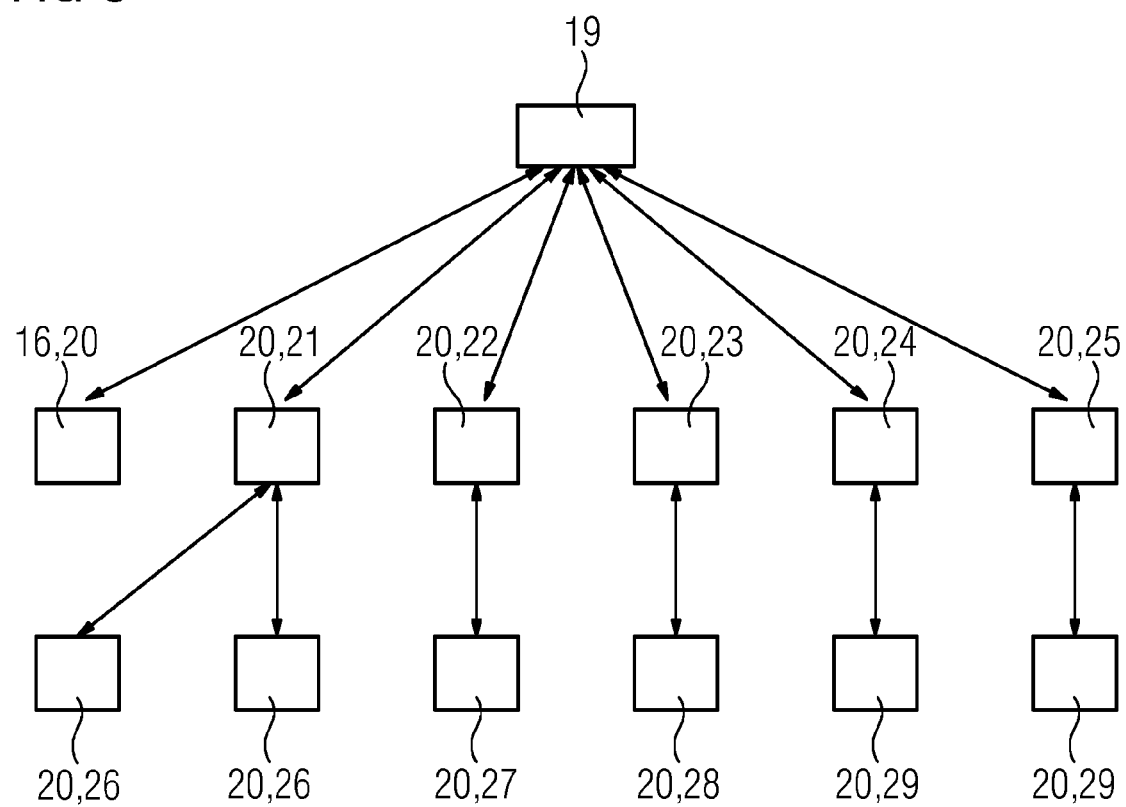
FIG. 6 shows a schematic representation to illustrate a signal flow structure for the devices from FIG. 5.

FIG. 5 shows a schematic representation of a virtual graphical 3D model 11, in the present case a peripheral rack 19, by way of illustration. As a hierarchically superordinate unit, this peripheral rack 19 comprises multiple devices 20 that are hierarchically subordinate to it. The peripheral rack 19 and the subordinate devices 20 are thus also embedded in a hierarchic structure, and signal transmission takes place along this hierarchic or tree structure, this being illustrated schematically in FIG. 6. The peripheral rack 19 forms the topmost hierarchic level here. The peripheral rack 19 can then transmit signals to the subordinate devices 20 of the next hierarchic level. By way of example, these are the power supply unit 16 and five bus modules 21 to 25 here.

Each of these bus modules 21 to 25 can in turn communicate with their hierarchically subordinate devices 20. For the first bus module 21, these are for example two interface modules 26, for example Siemens IM153-2 modules. The second bus module 22 can comprise for example a digital input-output module, such as for example Siemens SM323, or may be linked thereto for signal transmission purposes. The third bus module 23 can comprise for example a disconnecting assembly 28 (safety protector) or may be linked thereto so as to transmit signals. The fourth bus module 24 and the fifth bus module 25 can each comprise for example an input assembly 29, for example Siemens SM326, or may be linked or connected thereto so as to transmit signals.

By way of example, if a signal is thus meant to be exchanged between the peripheral rack 19 and the digital input-output module 27, this signal would pass through the second bus module 22 in the present case or would be forwarded as appropriate. Similarly, the peripheral rack 19 can transmit a signal or a prompt or request to the first bus module 21, for example. The implementation class of the latter or a corresponding behavior script for the first bus module 21 may then contain a stipulation regarding how said module is meant to react to such a signal. The first bus module 21 then reacts accordingly to the signal transmitted by the peripheral rack 19, that is to say for example implements a circuit or converts the signal and if necessary itself generates an output signal, which it then transmits to one of the interface modules 26, for example.

In order to appropriately replicate the hierarchic structure and the behavior of the individual virtual devices 2 and hardware components 3 and also of the installation's digital replica that is formed from each of these, the DOM and also behavior scripts describing the individual behaviors, which scripts may be written in C#, for example, and the base class are advantageously used here. All the relevant virtual devices 2 and hardware components 3 are thus digitized, that is to say transferred to the virtual reality, from the physical reality here, at least in terms of their form and their topology and also their behavior.

The list that was generated in method step S3 and indicates or represents the described hierarchic structure of the virtual devices 2 and hardware components 3 to be used is then processed. This is accomplished for example by using a method step S4 to store a root element of the hierarchic structure, that is to say the hierarchically highest virtual device 2, in a data structure, for example a stacking memory (stack). In a method step S5, a test is performed for whether the data structure includes at least one element or is empty. If the data structure includes at least one element, the method follows a program path P1 to a method step S6.

In method step S6, the topmost or most recently added element is read from the data structure and erased therefrom. In a method step S7, the element is instantiated. In a method step S8, the generated instance of the element is linked to or provided with device or component information associated with it that has been recorded in method step S2, for example.

In a method step S9, children, that is to say subordinate devices 20 or hardware components 3, of the respective element that are present based on the device or component information are recorded and are stored in the data structure. By following a program path P2, method steps S5 to S9 are then looped until the whole hierarchic structure, or the whole list, has been processed and it is accordingly established in a pass of method step S5 that the data structure includes no further elements.

In such a case, the method then follows a program path P3 to a method step S10. In method step S10, the instantiated elements, that is to say virtual devices 2, or hardware components 3, are put into their states provided according to the respective training scenario and in this way the virtual training environment is provided. The virtual training environment can then be output to a VR device, for example, at a start of the training in a method step S11.

When the training has concluded, the method can be terminated in a method step S12. Here, the training environment, or the digital replica of the installation that is generated therefor, can be discarded, for example, and the system 1 can be switched off or put into an initial or standby state.

In the manner that is described here, it is thus possible to generate and provide a particularly flexible and easily matchable digital twin of a real technical installation for training purposes. This is advantageously possible using digital standard components that can be dynamically combined with or linked to one another in various ways on a customer- and installation-specific basis according to need, in order to represent different installations, installation states, modifications and/or training scenarios. As such, an exact virtual or digital copy of an installation can be assembled in each case with particularly little work and expense that replicates not only the topology or design of said installation but also the behavior or mode of operation thereof. In particular, this is almost arbitrarily scalable for a wide variety of installation sizes, for example by using the standard components and the DOM. As such, an acceptably priced training option can be made possible with greatly increased reference to the respective real installation compared to static training installations that are not matched on a customer- or installation-specific basis. As a result of the digital replica in a VR training environment rather than for example a physical real training or twin installation being used here, it is also advantageously possible for a permanent training to take place directly in the area of the real replicated installation, resulting in improved training options in practice.

The invention claimed is:

1. A system for providing a digital replica of at least one part of an installation for a virtual training, comprising:
    a data memory that stores at least
        a base class, which implements, in a device-independent manner, functions of elementary hardware components that are usable in different devices, and
        a library of virtual devices, at least one of which incorporates at least one of the elementary hardware components and which deterministically replicate a topology and a functional behavior of corresponding real devices,
    a parser configured to read a file describing a predefined training scenario and to automatically generate therefrom a list of the respective virtual devices and/or hardware components with a hierarchic structure that are needed for the predefined training scenario to be replicated based on the topology and the functional behavior of the corresponding real devices,
    wherein the virtual devices have a hierarchically interleaved structure, with a result that a hierarchically higher device comprises at least one hierarchically lower device and/or at least one of the elementary hardware components, and
    wherein the system is configured to generate the digital replica from the virtual devices and/or the elementary hardware components in a manner matched to the predefined training scenario in each case.

2. The system as claimed in claim 1,
wherein, based on the hierarchic structure of the virtual devices, each virtual device is linked to its hierarchically superordinate and subordinate virtual devices when present, these links being able to be used to transmit signals between virtual devices of different hierarchic levels.

3. The system as claimed in claim 1, further comprising:
individual stipulations for each virtual device regarding how said virtual device reacts to which signals that it receives from its hierarchically superordinate devices and/or its hierarchically subordinate devices.

4. The system as claimed in claim 1,
wherein the system uses a document object model in order to implement the hierarchic structure of the virtual devices.

5. The system as claimed in claim 1,
wherein the functional behavior of the virtual devices is implemented by a respective script, a reaction of the respective virtual device to a signal transmitted to this device being described in the scripts.

6. The system as claimed in claim 1, further comprising:
a respective implementation class for each virtual device, in which properties of the respective virtual device that are not described in the base class are indicated.

7. The system as claimed in claim 1, further comprising:
a respective virtual graphical 3D model for each of the virtual devices, and/or also for the elementary hardware components.

8. A method for providing a digital replica of at least one part of an installation for a virtual training, the method comprising:
providing a base class, which implements, in a device-independent manner, functions of elementary hardware components that are usable in different devices,
providing a library of virtual devices classified into a hierarchy, at least one of which virtual devices incorporates at least one of the elementary hardware components and which virtual devices deterministically replicate a topology and a functional behavior of corresponding real devices,
a parser reading in a predefined training scenario and automatically generating therefrom a list of the respective virtual devices and/or hardware components with a hierarchic structure that are needed for the training scenario to be replicated based on the topology and the functional behavior of the corresponding real devices,
automatically generating the digital replica from the virtual devices and/or elementary hardware components that are needed based on the predefined training scenario.

9. The method as claimed in claim 8,
wherein the generated digital replica is embedded into a virtual training environment and this virtual training environment is output to an augmented reality (AR) device or to a virtual reality (VR) device.

10. A non-transitory computer readable media, comprising:
commands stored thereon that, when executed by a computer, cause said computer to perform the method as claimed in claim 8.

* * * * *